(12) United States Patent
Young et al.

(10) Patent No.: US 12,444,203 B2
(45) Date of Patent: Oct. 14, 2025

(54) APPARATUS AND METHODS FOR DETECTING TRAILER SWAY

(71) Applicant: HERE GLOBAL B.V., Eindhoven (NL)

(72) Inventors: Jeremy Michael Young, Chicago, IL (US); Jerome Beaurepaire, Nantes (FR); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 637 days.

(21) Appl. No.: 17/672,271

(22) Filed: Feb. 15, 2022

(65) Prior Publication Data

US 2023/0260288 A1 Aug. 17, 2023

(51) Int. Cl.

| | |
|---|---|
| *G06V 20/56* | (2022.01) |
| *G01S 17/88* | (2006.01) |
| *G06T 7/70* | (2017.01) |
| *G06V 10/764* | (2022.01) |
| *G07C 5/00* | (2006.01) |
| *G07C 5/02* | (2006.01) |
| *G08B 5/22* | (2006.01) |

(52) U.S. Cl.
CPC .............. *G06V 20/56* (2022.01); *G01S 17/88* (2013.01); *G06T 7/70* (2017.01); *G06V 10/764* (2022.01); *G06T 2207/20081* (2013.01); *G06T 2207/30252* (2013.01); *G07C 5/008* (2013.01); *G07C 5/02* (2013.01); *G08B 5/22* (2013.01)

(58) Field of Classification Search
CPC ........ G06V 20/56; G06V 10/764; G06T 7/70; G06T 2207/20081; G06T 2207/30252
See application file for complete search history.

(56) References Cited

U.S. PATENT DOCUMENTS

| | | | | |
|---|---|---|---|---|
| 10,106,193 | B2 * | 10/2018 | Lavoie | B60D 1/305 |
| 10,919,572 | B2 | 2/2021 | Mahabadi et al. | |
| 2014/0085472 | A1 * | 3/2014 | Lu | B60R 1/26 |
| | | | | 348/148 |
| 2014/0200759 | A1 * | 7/2014 | Lu | G06T 7/73 |
| | | | | 701/28 |
| 2016/0023525 | A1 * | 1/2016 | Lavoie | B60D 1/305 |
| | | | | 701/70 |

(Continued)

FOREIGN PATENT DOCUMENTS

| | | |
|---|---|---|
| CN | 111354225 A | 6/2020 |
| CN | 213241427 U | 5/2021 |

OTHER PUBLICATIONS

Dahal et al. "DeepTrailerAssist Deep learning based trailer detection tracking and articulation angle", 2019 (Year: 2019).*

(Continued)

*Primary Examiner* — Ming Y Hon
(74) *Attorney, Agent, or Firm* — Peter H. Yu; HERE GLOBAL B.V.

(57) ABSTRACT

An apparatus, method and computer program product are provided for providing trailer sway detection. In one example, the apparatus receives sensor data and determines a pitch angle of a trailer based on the sensor data. The apparatus further determines a confidence of trailer sway occurring based on the pitch angle and in response to the confidence exceeding a threshold, the apparatus generates a warning signal indicating a potential trailer sway.

17 Claims, 12 Drawing Sheets

(56) References Cited

U.S. PATENT DOCUMENTS

| | | | |
|---|---|---|---|
| 2017/0240125 A1 | 8/2017 | Weigert et al. | |
| 2018/0025662 A1* | 1/2018 | Taub | G09B 9/048 |
| | | | 434/63 |
| 2019/0347498 A1* | 11/2019 | Herman | G08G 1/162 |
| 2019/0375454 A1* | 12/2019 | Kasaiezadeh Mahabadi | |
| | | | B62D 13/00 |
| 2020/0249683 A1* | 8/2020 | Rosales | G08G 1/166 |
| 2021/0078572 A1* | 3/2021 | Kim | B60W 30/12 |
| 2022/0063720 A1* | 3/2022 | Oh | B60D 1/245 |
| 2022/0084212 A1* | 3/2022 | Dahal | G06N 3/08 |
| 2022/0144028 A1* | 5/2022 | Saini | B60D 1/62 |
| 2022/0353655 A1* | 11/2022 | Werle | B60W 50/0225 |
| 2023/0119562 A1* | 4/2023 | Diessner | B60W 40/06 |
| | | | 701/93 |
| 2023/0227011 A1* | 7/2023 | Zengin | B60T 8/1755 |
| | | | 701/70 |
| 2023/0249746 A1* | 8/2023 | Weston | B62D 13/00 |
| | | | 280/426 |
| 2023/0382174 A1* | 11/2023 | Coleman | B62D 53/062 |

OTHER PUBLICATIONS

No author found—"What You Need to Know About Correcting Trailer Sway," Hayes Towing Electronics.

Zhu, et al., "Integrated chassis control for vehicle rollover prevention with neural network time-to-rollover warning metrics," Advances in Mechanical Engineering 2016, vol. 8(2) 1-13 - DOI: 10.1177/1687814016632679.

* cited by examiner

APPARATUS AND METHODS FOR DETECTING TRAILER SWAY

TECHNICAL FIELD

The present disclosure generally relates to the field of trailer sway detection, associated methods and apparatus, and in particular, concerns, for example, an apparatus configured to generate a confidence of which a trailer is likely to sway based at least in part on an orientation of the trailer, attributes of the trailer, attributes of an environment of the trailer, or a combination thereof.

BACKGROUND

Vehicles towing trailers can be impacted by trailer sway based on environmental conditions. Trailer sway occurs when external forces, such as a strong wind and/or a wake induced by a passing vehicle, are applied on the trailer, thereby causing the trailer to move side to side. As the trailer continues to move side to side, the magnitude of the trailer sway may amplify, thereby rendering the vehicle and the trailer in a hazardous condition. Therefore, there is a need in the art to detect early signs of trailer sway and mitigate further amplification of thereof.

The listing or discussion of a prior-published document or any background in this specification should not necessarily be taken as an acknowledgement that the document or background is part of the state of the art or is common general knowledge.

BRIEF SUMMARY

According to a first aspect, a non-transitory computer-readable storage medium having computer program code instructions stored therein is described. The computer program code instructions, when executed by at least one processor, cause the at least one processor to: receive sensor data; based on the sensor data, determine a pitch angle of a trailer; based on the pitch angle, determine a confidence of trailer sway occurring; and responsive to the confidence exceeding a threshold, generate a warning signal indicating potential trailer sway.

According to a second aspect, an apparatus comprising at least one processor and at least one non-transitory memory including computer program code instructions is described. The computer program code instructions, when executed, cause the apparatus to: receive sensor data; based on the sensor data, determine a direction at which a trailer extends; based on the sensor data, determine a horizontal plane; determine an angle at which the direction intersects the horizontal plane; based on the angle, determine a confidence of trailer sway occurring; and responsive to the confidence exceeding a threshold, generate a warning signal indicating potential trailer sway.

According to a third aspect, a method of providing trailer sway detection is described. The method comprising: receiving sensor data; based on the sensor data, determining one or more pitch angles of a trailer, a vehicle towing the trailer, or a combination thereof; based on the one or more pitch angles, determining a confidence of trailer sway occurring; and responsive to the confidence exceeding a threshold, causing a notification indicating potential trailer sway on a user equipment (UE).

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

Vehicles towing trailers can be impacted by trailer sway based on environmental conditions. For example, a wind blowing against the trailer or a wake induced by a vehicle passing the towing vehicle can apply forces on the trailer, thereby initiating trailer sway. Trailer sway can further intensify based on weight distribution of the trailer. For example, if the trailer is heavier at a rear portion of the trailer than a front portion of the trailer, the trailer has a higher chance of being impacted by non-recoverable trailer sway, which ultimately leads to a catastrophic accident. Additionally, the magnitude of the trailer sway amplifies with each sway; therefore, identifying initial stages of the trailer sway is critical for preventing non-recoverable trailer sway and accidents. However, identification of such stages can be non-detectable for human eye, and even if such stages are observed, it may be challenging for a person to perceive whether the stages indicate trailer sway. Further, factors such as weather and geographic attributes can adversely affect trailers and increase a chance of trailer sway occurring. There will now be described an apparatus and associated methods that may address these issues.

Figure 1:
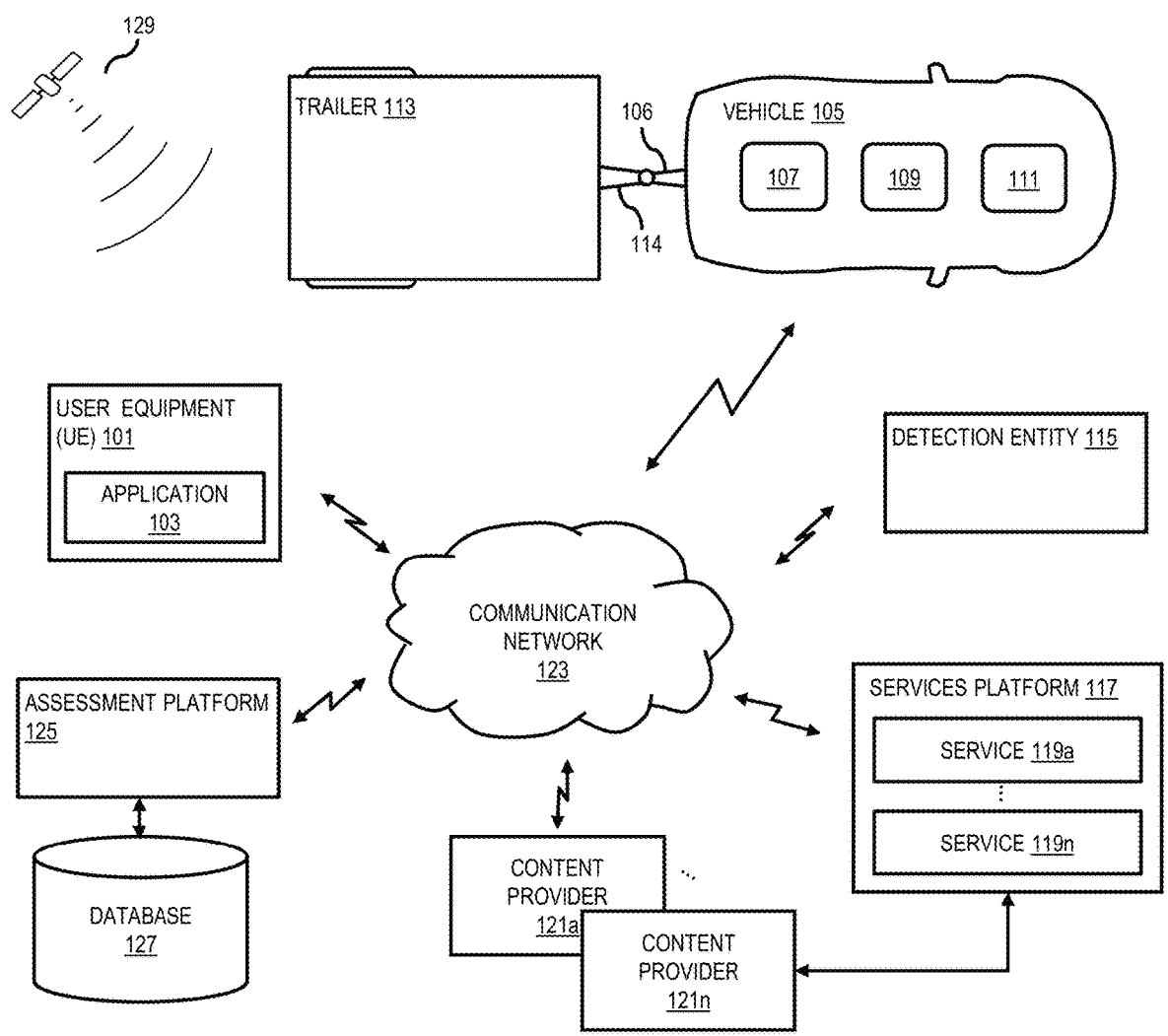
FIG. 1 illustrates a diagram of a system capable of providing trailer sway detection.

FIG. 1 is a diagram of a system 100 capable of providing trailer sway detection, according to one embodiment. The system includes a user equipment (UE) 101, a vehicle 105, a trailer 113, a detection entity 115, a services platform 117, content providers 121a-121n, a communication network 123, an assessment platform 125, a database 127, and a satellite 129. Additional or a plurality of mentioned components may be provided.

In the illustrated embodiment, the system 100 comprises a user equipment (UE) 101 that may include or be associated with an application 103. In one embodiment, the UE 101 has connectivity to the assessment platform 125 via the communication network 123. The assessment platform 125 performs one or more functions associated with providing trailer sway detection. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle, or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.). The UE 101 may be a device associated with the vehicle 105 and/or one or more other vehicles (not illustrated) proximate to the vehicle 105. For example, the UE 101 may be a mobile device of an occupant of the vehicle 105 or another vehicle proximate to the vehicle 105 or a user interface of an infotainment system of the vehicle 105 or another vehicle proximate to the vehicle 105.

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the assessment platform 125 and perform one or more functions associated with the functions of the assessment platform 125 by interacting with the assessment platform 125 over the communication network 123. The application 103 may assist in conveying and/or receiving information regarding trailer sway detection. For example, the application 103 may cause the UE 101 to provide a notification indicating detection of trailer sway, a likelihood in which a vehicle towing a trailer will be impacted by trailer sway, locations in which trailer sway is likely to occur, etc.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

The vehicle 105 includes a tow hitch 106 attached to a chassis of the vehicle 105. The tow hitch 106 may be coupled to a trailer coupler 114 of the trailer 113. The tow hitch 106 may be in a form of a tow ball to allow swivelling and articulation of the trailer 113, a tow pin, or a tow hook with a trailer loop. The vehicle 105 further includes a plurality of sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, suspension sensor, tilt sensors to detect the degree of incline or decline of the vehicle 105 along a path of travel, etc. In a further embodiment, sensors about the perimeter of the vehicle 105 may detect the relative distance of the vehicle 105 from road objects (e.g., road markings), lanes, or roadways, the presence of other vehicles, pedestrians, traffic lights, road objects, road features (e.g., curves) and any other objects, or a combination thereof. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies. One or more of the sensors 107 may be installed on the exterior surface or external components of the vehicle 105, within the interior cabin of the vehicle 105, between the interior cabin and the exterior surface of the vehicle 105, or a combination thereof.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the vehicle 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the assessment platform 125, the UE 101, the services platform 117, one or more of the content providers 121a-121n, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory. The on-board computing platform 111 may embody a software for performing one or more functions associated with detecting trailer sway. The software may be stored in the memory as computer program code and may be executable by the processor of the on-board computing platform 111 to cause the processor to interact with various components of the vehicle 105. In one embodiment, the software may be downloaded from the assessment platform 125 and further interact with the assessment platform 125 and said components of the vehicle 105.

The detection entity 115 may be another vehicle, a drone, a user equipment, a road-side sensor, or a device mounted on a stationary object within or proximate to a road segment (e.g., a traffic light post, a sign post, a post, a building, etc.). The detection entity 115 includes one or more image sensors (e.g., electronic imaging devices of both analog and digital types, which include digital cameras, camera modules, camera phones, thermal imaging devices, radar, sonar, lidar, etc.) for capturing images of vehicles and/or trailers connected thereto (such as the vehicle 105 and/or the trailer 113). The detection entity 115 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 115 along a path of travel, etc. In a further embodiment, sensors about the perimeter of the detection entity 115 may detect the relative distance of the detection entity 115 from road objects (e.g., road markings), lanes, or roadways, the presence of other vehicles, pedestrians, traffic lights, road objects, road features (e.g., curves) and any other objects, or a combination thereof. In one embodiment, the detection entity 115 may include GPS receivers to obtain geographic coordinates from satellites 127 for determining current location and time associated with the detection entity 115. Further, the location can be determined by a triangulation system such as A-GPS, Cell of Origin, or other location extrapolation technologies. The detection entity 115 may further include a receiver and a transmitter for maintaining communication with the assessment platform 125 and/or other components within the system 100.

The services platform 117 may provide one or more services 119a-119n (collectively referred to as services 119), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 117 may be an original equipment manufacturer (OEM) platform. In one embodiment the one or more service 119 may be sensor data collection services. By way of example, vehicle sensor data provided by the sensors 107 may be transferred to the UE 101, the assessment platform 125, the database 127, or other entities communicatively coupled to the communication network 123 through the service platform 115. In one embodiment, the services platform 117 uses the output data generated by of the assessment platform 125 to provide services such as navigation, mapping, other location-based services, etc.

In one embodiment, the content providers 121a-121n (collectively referred to as content providers 121) may provide content or data (e.g., including geographic data, parametric representations of mapped features, etc.) to the UE 101, the vehicle 105, services platform 117, the vehicle 105, the database 127, the assessment platform 125, or the combination thereof. In one embodiment, the content provided may be any type of content, such as map content, textual content, audio content, video content, image content, etc. In one embodiment, the content providers 121 may provide content that may aid in providing trailer sway detection, and/or other related characteristics. In one embodiment, the content providers 121 may also store content associated with the UE 101, the vehicle 105, services platform 117, the assessment platform 125, the database 127, or the combination thereof. In another embodiment, the content providers 121 may manage access to a central repository of data, and offer a consistent, standard interface to data, such as a repository of the database 127.

The communication network 123 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the assessment platform 125 may be a platform with multiple interconnected components. The assessment platform 125 may include multiple servers, intelligent networking devices, computing devices, components and corresponding software for providing trailer sway detection. It should be appreciated that that the assessment platform 125 may be a separate entity of the system 100, included within the UE 101 (e.g., as part of the applications 103), included within the vehicle 105 (e.g., as part of an application stored in the memory of the on-board computing platform 111), included within the detection entity 115, included within the services platform 117 (e.g., as part of an application stored in server memory for the services platform 117), included within the content providers 121 (e.g., as part of an application stored in sever memory for the content providers 121), other platforms embodying a power supplier (not illustrated), or a combination thereof.

The assessment platform 125 receives sensor data from the vehicle 105 and/or the detection entity 115 and determine whether trailer sway is occurring or is likely to occur based on the sensor data. The sensor data may be image data depicting the vehicle 105 and/or the trailer 113. The sensor data may be acquired via one or more of the sensors 107 of the vehicle 105 (e.g., a rear-view camera, a side-view mirror camera facing a rear view of the vehicle 105, lidar, etc.) and/or one or more sensors of the detection entity 115. In one embodiment, the assessment platform 125 may render the determination of trailer sway based on weight distribution of the trailer 113. To estimate the weight distribution of the trailer 113, the assessment platform 125 may analyze the acquired sensor data to determine an angle at which the trailer 113 is coupled to the vehicle 105 (e.g., a pitch angle of the trailer 113). By way of example, the assessment platform 125 may determine that the weight distribution of the trailer 113 is balanced if a longitudinal axis of the trailer 113 (i.e., a direction at which the trailer 113 extends) is parallel or nearly parallel with respect to a plane of reference. The plane of reference may be a horizontal plane (i.e., a plane that is perpendicular to an axis stretching from the center of the earth to an object of interest, such as the vehicle 105 or the trailer 113). In some scenarios, the plane of reference may be a plane that is parallel to a surface of a ground that is local to the object of interest. The assessment platform 125 may determine that the weight distribution of the trailer 113 is unbalanced if the longitudinal axis of the trailer 113 and the plane of reference are non-parallel. Generally, if the longitudinal axis of the trailer 113 and the plane of reference are non-parallel, a tongue weight of the trailer 113 (i.e., an amount of static force that the trailer tongue exerts on a hitch ball of the vehicle 105) is not within an acceptable range (e.g., between 10 percent and 15 percent of a gross trailer weight). In one embodiment, the assessment platform 125 determines a trailer sway confidence based on the angle between the longitudinal axis of the trailer 113 and the plane of reference. The trailer sway confidence indicates a likelihood in which trailer sway will occur for a given trailer. By way of example, if the longitudinal axis of the trailer 113 is offset from the plane of reference at no less than 5 percent, the calculation module 303 may assign a first level of confidence, and if the longitudinal axis of the trailer 113 is offset from the plane of reference between 5 to 10 percent, the calculation module 303 may assign a second greater level of confidence, and so on.

In one embodiment, the assessment platform 125 may determine a likelihood of trailer sway occurring based on weight distribution of the vehicle 105. In such embodiment, the assessment platform 125 may determine an angle of at which the vehicle 105 is coupled to the trailer 113. Similar to determining the angle at which the longitudinal axis of the trailer 113 intersects the plane of reference, the assessment platform 125 determines an angle at which a longitudinal axis of the vehicle 105 intersects the plane of reference. As such, in one embodiment, the assessment platform 125 may further increase the trailer sway confidence if the longitudinal axis of the vehicle 105 is also offset from the plane of reference. While the assessment platform 125 typically estimates the pitch angle of the vehicle 105 and/or the trailer 113 to determine the trailer sway confidence, it should be appreciated that the roll angle of the vehicle 105 and/or the trailer 113 or a combination of the pitch angel and the roll angle may also impact the likelihood of trailer sway occurring. For example, as an angle between a lateral axis of the vehicle 105 and/or the trailer 113 and the plane of reference increases/decreases, the trailer sway confidence increases accordingly.

It is contemplated that even when the tongue weight of the trailer 113 is within an acceptable range (e.g., within 10 to 15 percent), a longitudinal axis of the vehicle 105 and/or the trailer 113 may be offset from the plane of reference due to other reasons (e.g., uneven terrain, wind direction, etc.). As such, in one embodiment, the assessment platform 125 may analyze sensor data indicating the vehicle 105 and/or the trailer 113 over a period of time to determine the trailer sway confidence. For example, the sensor data may be image data depicting the vehicle 105 and/or the trailer 113 over a period of time. In such example, if the longitudinal axis of the vehicle 105 and/or the trailer 113 is offset from the plane of reference for a majority of the period, the assessment platform 125 may increase the trailer sway confidence.

In one embodiment, the assessment platform 125 may perform image classification to estimate weight distribution of the trailer 113. In such embodiment, the assessment platform 125 may identify trailer attributes associated with the trailer 113 by classifying one or more images of the trailer 113. The trailer attribute may indicate a model, type, classification, overall size of the trailer, sizes of components of the trailer, overall weight of the trailer, weight distribution (excluding loads within the trailer), tire size, tire load index capacity, etc. In one embodiment, the assessment platform 125 may analyze the one or more images to determine whether the trailer 113 is carrying one or more loads thereon. If so, the assessment platform 125 may classify the one or more loads to estimate the weight thereof and use the estimated weight of the one or more loads for estimating the weight distribution of the trailer 113. In one embodiment, the assessment platform 125 performs image segmentation to divide an image of the trailer 113 into parts. In such embodiment, each segmented image may be classified to render estimation of a weight of said part. The estimation of weight of said part may be dependent on amount of space occupied by the portion of the trailer 113 as depicted in the segmented image and an angle at which the image of the trailer 113 is captured. Once the weight estimation is performed for each segmented image of the trailer 113, the assessment platform 125 estimates the weight distribution of the trailer 113, identifies a location of trailers wheels, compares the weight distribution relative to said location. Based on such comparison, the assessment platform 125 adjusts the trailer sway confidence. For example, if the assessment platform 125 estimates that the weight of the trailer 113 is concentrated behind the trailer wheels, the assessment platform 125 increases the trailer sway confidence.

Similar to performing image classification on one or more images of the trailer 113 and estimating the weight distribution of the trailer 113, the assessment platform 125 may perform image classification on one or more images of the vehicle 105 to estimate the weight distribution of the vehicle 105. Specifically, such image classification is performed on image data acquired by one or more detection entities 115 that is proximate to the vehicle 105. Alternatively or additionally, the sensors 107 (e.g., oriental sensors, suspension sensors, etc.) may indicate weight distribution of the vehicle 105. Once the weight distribution of the vehicle 105 is identified, the assessment platform 125 determines one or more areas in which the weight of the vehicle 105 is concentrated and adjusts the trailer sway confidence based on said areas. For example, if the weight of the vehicle 105 is biased towards the front or the back of the vehicle 105, the assessment platform 125 increases the trailer sway confidence.

As discussed above, the assessment platform 125 may determine whether the vehicle 105 is being impacted by trailer sway based on sensor data. In some cases, the initial phase of the trailer sway cannot be readily observed and perceived by a human. As such, sensor data indicating the initial phase are input to a machine learning model to determine whether the vehicle 105 is being impacted by trailer sway and the sway of the trailer 113 is intensifying. The assessment platform 125 receives sensor data representing a series of movement of the vehicle 105 and/or the trailer 113 over a period of time. Such sensor data may be input to a machine learning model, and in response, the machine learning model may output data indicating whether the trailer 113 is being impacted by trailer sway. The machine learning model may be trained to identify trailer sway based on historical data of past events in which trailers were impacted by trailer sway. The historical data may include sensor data, such as image data, indicating series of movements associated with said trailers during said past events. The sensor data may indicate the series of movement from different positions and orientations. For example, the sensor data may be captured by a rear-facing camera of the vehicle 105, one or more side-view mirror cameras of the vehicle 105, one or more cameras of a vehicle proximate to the vehicle 105, etc. When the machine learning model receives sensor data, the machine learning model attempts to yield an accurate prediction by identifying historical data that share the same or similar attributes as the received sensor data (e.g., the same or similar type of vehicle, trailer, camera positions/orientations for capturing sensor data, etc.). If such sensor data are not available, the assessment platform 125 may establish a model of the vehicle 105 and/or the trailer 113 based on the received sensor data, and the machine learning model may yield the prediction based on the model and the historical data.

In one embodiment, the assessment platform 125 may determine the trailer sway confidence based at least in part on attributes of an environment in which the vehicle 105 is traversing and is estimated to traverse. In such embodiment, the assessment platform 125 may receive location information associated with the vehicle 105, such as a current location of the vehicle 105 (e.g., GPS coordinates) and a route of the vehicle 105. Based on the location information, the assessment platform 125 acquires attributes of one or more environments associated with the location information from one or more detection entities 115, services platform 117, content providers 121, database 127, or a combination thereof. For example, the attributes may indicate road attributes (e.g., road types, coefficient of friction of a road segment/link, road curvature, road condition, etc.), weather conditions, weather forecast information, point-of-interests (POIs) (e.g., camping grounds, forest preserves, tourism attraction sites, etc), etc. The attributes associated with the location information are input to a machine learning model to output the trailer sway confidence. In such embodiment, the machine learning model is trained based on historical data of events in which trailer sway have occurred. The historical data may be correlated with information on attributes of environments for said events. For example, the historical data may indicate that a trailer sway event has occurred at a given road segment due to icy road conditions and high wind conditions impacting the road segment at the time of the event. When information on attributes of location information associated with the vehicle 105 are input to the machine learning model, the machine learning model attempts to output an accurate measurement of trailer sway confidence by identifying historical data that are the same or similar to the received attribute information (e.g., the same or similar type of road attributes, weather conditions, etc.). As such, the application of the machine learning model is not limited to locations in which past events of trailer sway have occurred, but the machine learning model can be also be applied at locations in which no instances of trailer sway have been recorded.

Once the trailer sway confidence is determined, the assessment platform 125 may determine whether the trailer sway confidence exceeds a threshold level. In such embodiment, the threshold level may indicate that trailer sway is highly likely to occur for the vehicle 105. If the threshold level is satisfied, the assessment platform 125 may cause a notification of trailer sway on the UE 101, a user interface associated with the vehicle 105, a user interface associated with one or more vehicles proximate to the vehicle 105, or a combination thereof. In one embodiment, the notification may be provided on the user interface of the vehicle 105 to alert one or more vehicles proximate to the vehicle 105 via vehicle lights, hazard lights, vehicle horn, vehicle-to-vehicle (V2V) communication, and/or other alerting systems. In one embodiment, the notification may be provided on the user interfaces of the one or more vehicles proximate to the vehicle 105 to alert the vehicle 105 and/or one or more other vehicles via vehicle headlights, vehicle horn, V2V and/or other alerting systems. In one embodiment, the assessment platform 125 may cause the vehicle 105 to automatically alert one or more vehicles proximate to the vehicle 105 via vehicle lights, hazard lights, vehicle horn, V2V communication, and/or other alerting systems. In one embodiment, the assessment platform 125 may cause the one or more vehicles proximate to the vehicle 105 to automatically alert the vehicle 105 and/or other vehicles via vehicle lights, hazard lights, vehicle horn, V2V communication, and/or other alerting systems. In one embodiment, if the trailer sway confidence exceeds the threshold level, the assessment platform 125 may output a control signal to the vehicle 105 that causes the vehicle 105 to autonomously perform a driving maneuver that mitigates occurrence of trailer sway or further intensification thereof (e.g., causing the vehicle 105 to slow down, keeping the wheels of the vehicle 105 straight, causing the vehicle 105 to gradually decrease the speed thereof to a stop, etc.). In one embodiment, if the trailer sway confidence exceeds the threshold level, assessment platform 125 may output a control signal to one or more vehicles proximate to the vehicle 105 that causes said vehicles to autonomously perform a driving maneuver that mitigates potential impact with the vehicle 105 (e.g., causing said vehicles to slow down, change lanes, move past the vehicle 105, etc.)

In the illustrated embodiment, the database 127 stores information on road links (e.g., road length, road breadth, slope information, curvature information, geographic attributes, etc.), probe data for one or more road links (e.g., traffic density information), POIs, and other types map-related features. In one embodiment, the database 127 may include any multiple types of information that can provide means for aiding in providing trailer sway detection. For example, the database 127 may store historical data indicating past events of trailer sway, vehicles and/or trailers that induced said events, vehicle attributes thereof, attributes of environments in which said events occurred, etc. It should be appreciated that the information stored in the database 127 may be acquired from any of the elements within the system 100, other vehicles, sensors, database, or a combination thereof.

In one embodiment, the UE 101, the vehicle 105, the detection entity 115, the services platform 117, the content providers 121, the assessment platform 125 communicate with each other and other components of the communication network 123 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
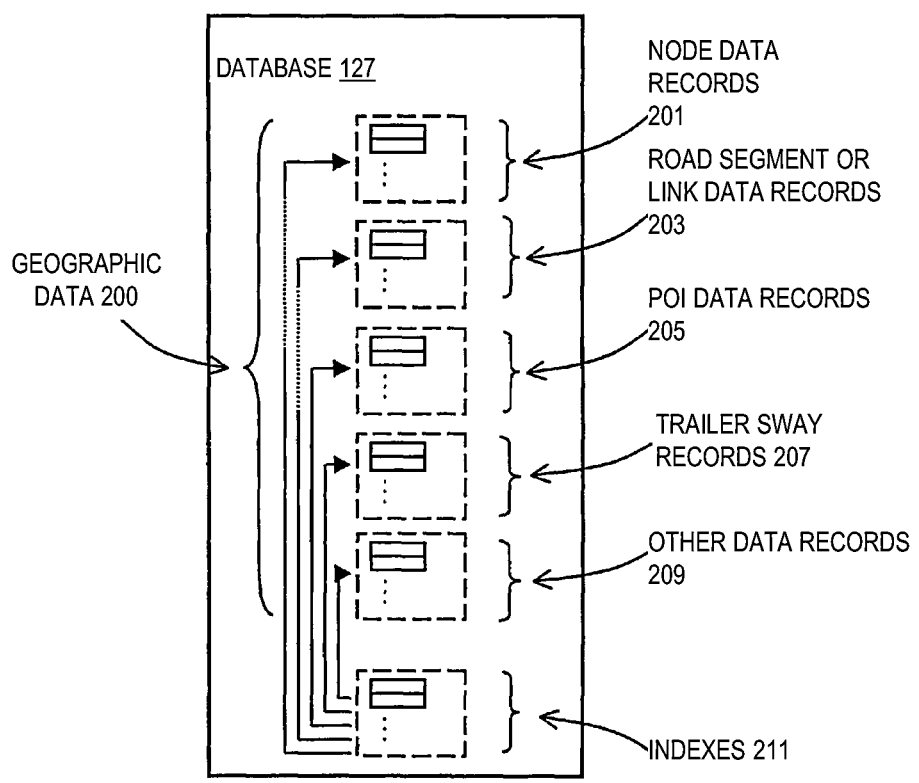
FIG. 2 illustrates a diagram of the database within the system of FIG. 1.

FIG. 2 is a diagram of a database 127 (e.g., a map database), according to one embodiment. In one embodiment, the database 127 includes data 200 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 127.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 127 follows certain conventions. For example, links do not cross themselves and do not cross each other except at a node or vertex. Also, there are no duplicated shape points, nodes, or links. Two links that connect each other have a common node or vertex. In the database 127, overlapping geographic features are represented by overlapping polygons. When polygons overlap, the boundary of one polygon crosses the boundary of the other polygon. In the database 127, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 127 is presented according to a hierarchical or multi-level tile projection. More specifically, in one embodiment, the database 127 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grids. Because of the numbering system, the exact position of any tile in any level of the map tile grid or projection may be uniquely determined from the tile ID.

As shown, the database 127 includes node data records 201, road segment or link data records 203, POI data records 205, trailer sway records 207, other records 209, and indexes 211, for example. More, fewer or different data records can be provided. In one embodiment, additional data records (not shown) can include cartographic ("carto") data records, routing data, and maneuver data. In one embodiment, the indexes 211 may improve the speed of data retrieval operations in the database 127. In one embodiment, the indexes 211 may be used to quickly locate data without having to search every row in the database 127 every time it is accessed.

In exemplary embodiments, the road segment data records 203 are links or segments representing roads, streets, or paths, as can be used in the calculated route or recorded route information for determination of one or more personalized routes. The node data records 201 are end points (such as intersections) corresponding to the respective links or segments of the road segment data records 203. The road link data records 203 and the node data records 201 represent a road network, such as used by vehicles, cars, and/or other entities. Alternatively, the database 127 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 127 can include data about the POIs and their respective locations in the POI data records 205. The database 127 can also include data about places, such as cities, towns, or other communities, and other geographic features, such as bodies of water, mountain ranges, etc. Such place or feature data can be part of the POI data records 205 or can be associated with POIs or POI data records 205 (such as a data point used for displaying or representing a position of a city).

The trailer sway records 207 may include historical data of past events in which vehicles coupled to trailer and/or trailers were impacted by trailer sway. The historical data may include sensor data, such as image data, indicating series of movements associated with said vehicle and/or trailers during said past events. The historical data may further indicate attributes of vehicles impacted by trailer sway, such as model, type, classification, position/orientation of sensors, such as camera/lidar, on the vehicle, etc. The historical data may also indicate attributes of trailers impacted by trailer sway, such as model, type, classification, overall size of the trailer, sizes of components of the trailer, overall weight of the trailer, weight distribution (excluding loads within the trailer), tire size, tire load index capacity, etc. The historical data may also indicate a gross combined weight rating (GCWR) of the vehicle and the trailer impacted by trailer sway. The historical data may also indicate attributes of environments in which trailer sway events have occurred, such as road attributes (e.g., road types, coefficient of friction of a road segment/link, road curvature, road condition, etc.), weather conditions, weather forecast information, location and proximity of POIs associated with said events (e.g., camping grounds, forest preserves, tourism attraction sites, etc).

Other records 209 may include data used for classifying sensor data, such as image data. Such data may correlate images of vehicle and/or trailers to model, type, classification, and other vehicle/trailer related attributes. Other records 209 may also include sensor data that indicates a measurement of a plane of reference (e.g., using gyroscope/suspension sensors to identify a plane of reference) and data defining a projection of the plane of reference in image data, sensor data indicating longitudinal axis of vehicles/trailers (e.g., using image classification to identify edges of a trailer to determine a general direction in which the trailer extends). Other records 209 may also include algorithms for performing image segmentation and estimating weight of an object based on one or more images thereof.

In one embodiment, the database 127 can be maintained by the services platform 117 and/or one or more of the content providers 121 in association with a map developer. The map developer can collect geographic data to generate and enhance the database 127. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 127 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing trailer sway detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 3:
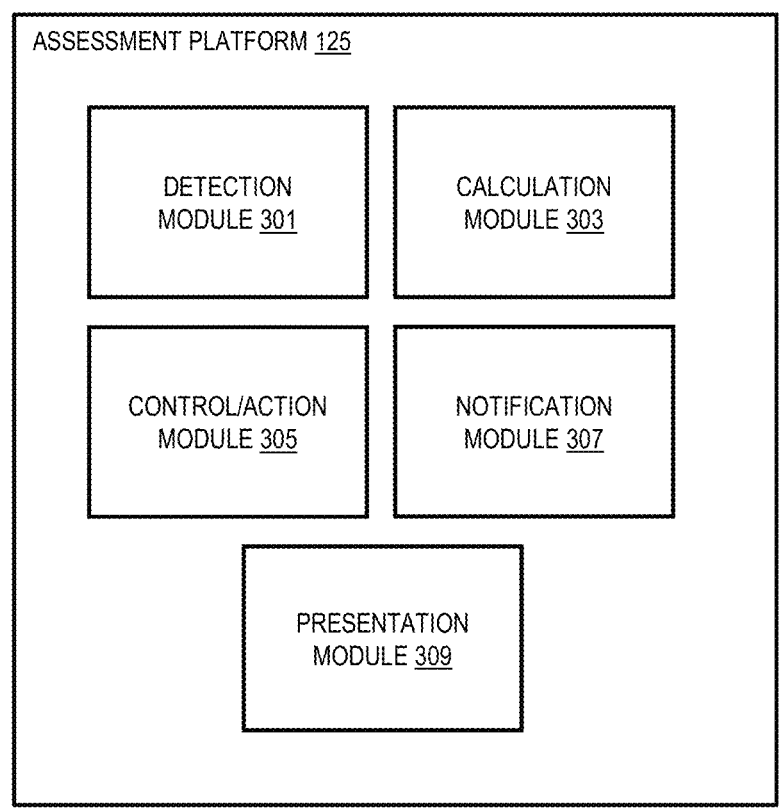
FIG. 3 illustrates a diagram of the components of the assessment platform of FIG. 1.

FIG. 3 is a diagram of the components of the assessment platform 125, according to one embodiment. By way of example, the assessment platform 125 includes one or more components for detecting trailer sway. It is contemplated that the functions of these components may be combined in one or more components or performed by other components of equivalent functionality. In this embodiment, the assessment platform 125 includes a detection module 301, a calculation module 303, a control/action module 305, a notification module 307, and a presentation module 309.

The detection module 301 acquires sensor data from one or more entities, such as the vehicle 105 and/or the detection entities 113. The sensor data may be image data depicting the vehicle 105 and/or the trailer 113. The sensor data may be acquired via one or more of the sensors 107 of the vehicle 105 (e.g., a rear-view camera, a side-view mirror camera facing a rear view of the vehicle 105, lidar, etc.) and/or one or more sensors of the detection entity 115 (e.g., lidar, camera, etc.). The detection module 301 may also acquire data for classifying sensor data indicating the vehicle 105 and/or the trailer 113. Such data may correlate images of vehicle and/or trailers to model, type, classification, and other vehicle/trailer related attributes. The detection module 301 may also acquire location information associated with the vehicle 105, identify one or more detection entities 115 proximate to the vehicle 105, identify one or more vehicles that are capable of establishing V2V communication with the vehicle 105, and retrieve information indicating attributes of environments associated with the location information. The detection module 301 may also acquire historical data including past events of trailer sway within one or more road segments in a road network. It is contemplated that the detection module 301 is capable of acquiring any data from any components within the system 100 of FIG. 1.

Figure 4A:
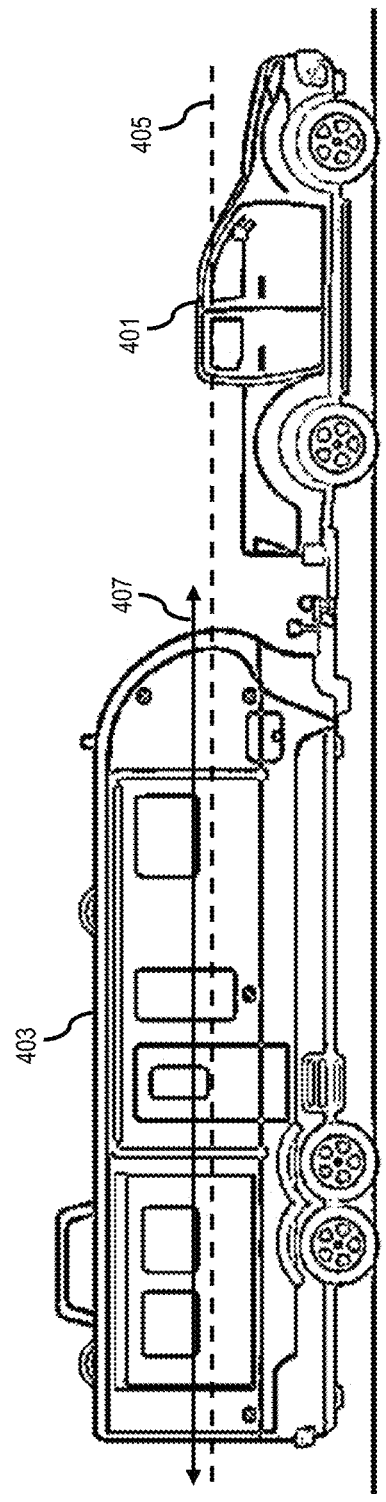
FIG. 4A illustrates an example scenario in which a vehicle and a trailer are balanced.

The calculation module 303 is capable of receiving data acquired via the detection module 301 and processing the data to be used via the control/action module 305, the notification module 307, the presentation module 309, or a combination thereof. In one embodiment, the calculation module 303 may render the determination of trailer sway based on weight distribution of the trailer 113. To estimate the weight distribution of the trailer 113, the calculation module 303 may analyze sensor data acquired via the detection module 301 to determine an angle at which the trailer 113 is coupled to the vehicle 105. By way of example, the calculation module 303 may determine that the weight distribution of the trailer 113 is balanced if a longitudinal axis of the trailer 113 is parallel or nearly parallel with respect to a plane of reference. For example, FIG. 4A illustrates an example scenario 400A in which a vehicle 401 and a trailer 403 are balanced. In such example, it is assumed that the scenario 400A is a representation of an image captured by an image capturing device from a side of the vehicle 401/trailer 403. In such example, the calculation module 303 renders a plane of reference 405 for determining a pitch angle of the trailer 403. The calculation module 303 may render the plane of reference 405 based on sensor data captured via a sensor local to the trailer 403 (e.g., gyroscope/suspension sensors available within the vehicle 401, one or more vehicles proximate to the vehicle 401, etc.). The calculation module 303 further determines a longitudinal axis 407 of the trailer 403 based on information acquired via the detection module 301 and/or image classification. The calculation module 303 compares the plane of reference 405 and the longitudinal axis 407 to determine whether the plane of reference 405 and the longitudinal axis 407 intersect and determines that the plane of reference 405 is parallel to the longitudinal axis 407. As such, the calculation module 303 concludes that the connection between the vehicle 401 and the trailer 403 is balanced.

Figure 4B:
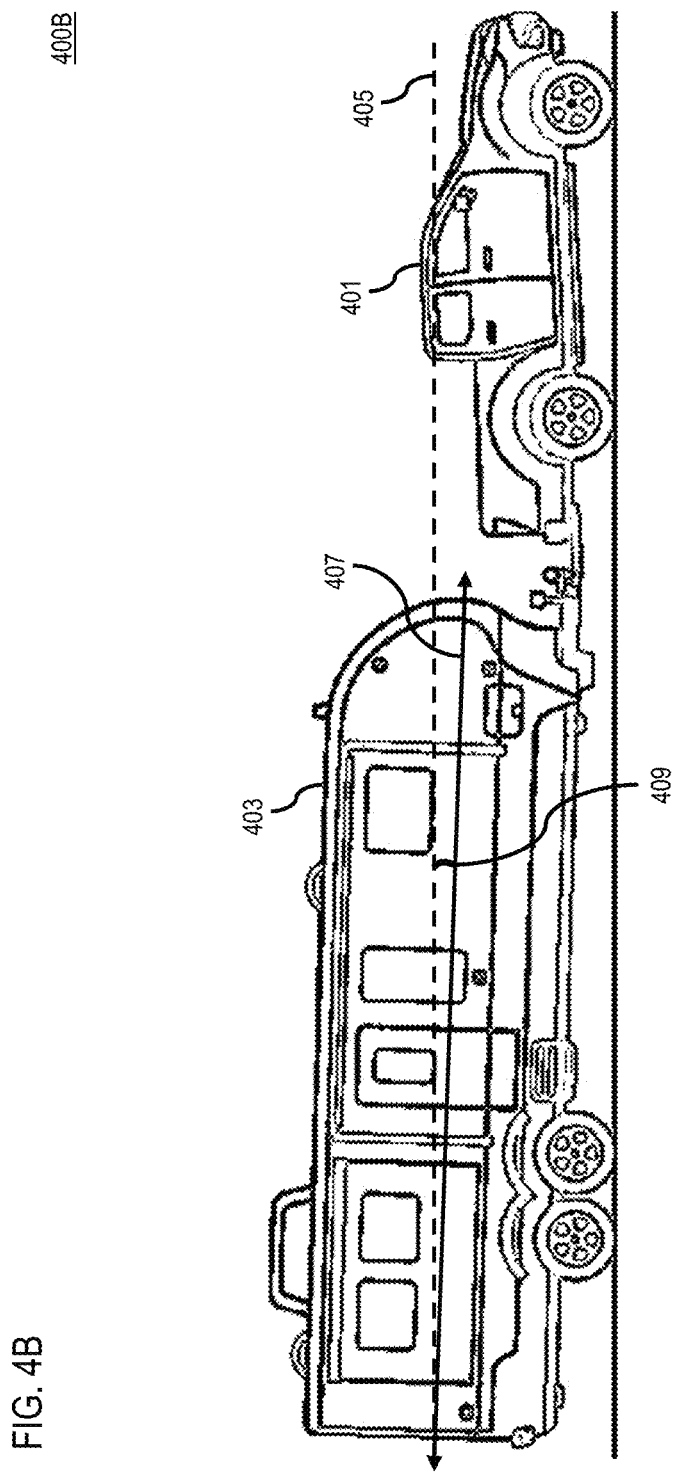
FIG. 4B illustrates an example scenario in which the vehicle and the trailer are unbalanced.

FIG. 4B illustrates an example scenario 400B in which the vehicle 401 and the trailer 403 are unbalanced. In such example, the calculation module 303 compares the plane of reference 405 and the longitudinal axis 407 to determine whether the plane of reference 405 and the longitudinal axis 407 intersect and determines that the plane of reference 405 intersects the longitudinal axis 407 at an angle 409. The calculation module 303 further compares the angle 409 to a threshold range. In such example, the calculation module 303 may determine that the weight distribution of the trailer 403 is unbalanced if the longitudinal axis 405 intersects the plane of reference at an angle outside the threshold range. The threshold range correlates to a tongue weight of the trailer 403 (i.e., an amount of static force that the trailer tongue exerts on a hitch ball of the vehicle 401). As such, as the tongue weight increases or decreases, the angle at which the longitudinal axis of the trailer 403 intersects the plane of reference increases. In one embodiment, the threshold range may be defined by angles between a first angle and a second angle. The first angle is an angle at which a tongue weight is 10 percent of a gross trailer weight, and the second angle is an angle at which the tongue weight is 15 percent of the gross trailer weight. In scenario 400B, the calculation module 303 determines that the angle 409 exceeds the second angle. As such, the calculation module 303 concludes that the connection between the vehicle 401 and the trailer 403 is unbalanced.

Figure 4C:
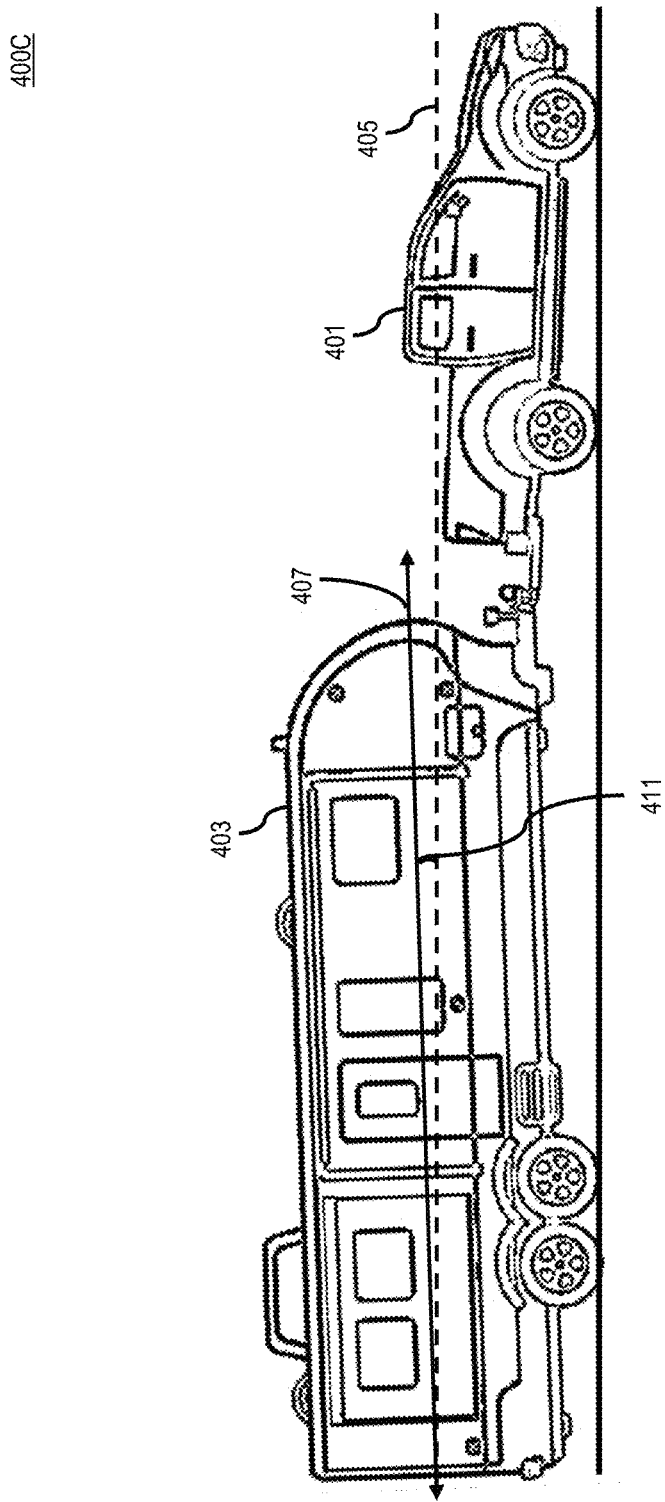
FIG. 4C illustrates another example scenario in which the vehicle and the trailer are unbalanced.

FIG. 4C illustrates another example scenario 400C in which the vehicle 401 and the trailer 403 are unbalanced. In such example, the calculation module 303 compares the plane of reference 405 and the longitudinal axis 407 to determine whether the plane of reference 405 and the longitudinal axis 407 intersect and determines that the plane of reference 405 intersects the longitudinal axis 407 at an angle 411. The calculation module 303 further compares the angle 411 to a threshold range. In scenario 400C, the calculation module 303 determines that the angle 411 is less than the first angle (i.e., the angle at which the tongue weight is 10 percent of the gross trailer weight). As such, the calculation module 303 concludes that the connection between the vehicle 401 and the trailer 403 is unbalanced.

It is contemplated that a comparison between a longitudinal axis of the vehicle/trailer and a plane of reference may not always yield an accurate estimation of whether the connection is balanced/unbalanced since: (1) a change in speed of the vehicle/trailer may alter the longitudinal axis thereof; (2) the vehicle/trailer is positioned on an incline/decline; and/or (3) the vehicle and/or the trailer is positioned on an uneven terrain. As such, in some embodiments, when the calculation module 303 renders a comparison between the longitudinal axis of the vehicle/trailer and the plane of reference, the calculation module 303 may: (1) alter the plane of reference based on a terrain of the ground local to the vehicle and/or the trailer and an angle of elevation/depression of said terrain; and/or (2) alter the plane of reference based on a speed of the vehicle/trailer (e.g., increasing vehicle speed tilts the plane of reference counter clockwise). In one embodiment, the calculation module 303 only render the comparison between the longitudinal axis and the plane of reference only when the vehicle/trailer is positioned on a flat terrain where the angle of elevation thereof neither increase nor decrease. In one embodiment, the calculation module 303 may determine that a vehicle and a trailer is balanced in the longitudinal axis of the vehicle and the longitudinal axis of the trailer extends along the same direction.

In one embodiment, the calculation module 303 may assign a trailer sway confidence to indicate a likelihood of trailer sway occurring. The trailer sway confidence may be quantified based on a degree at which the longitudinal axis of the trailer 113 is offset from the plane of reference. For example, if the longitudinal axis of the trailer 113 is offset from the plane of reference at no less than 5 percent, the calculation module 303 may assign a first level of confidence, and if the longitudinal axis of the trailer 113 is offset from the plane of reference between 5 to 10 percent, the calculation module 303 may assign a second greater level of confidence, and so on.

In one embodiment, the calculation module 303 may determine a likelihood of trailer sway occurring based on weight distribution of the vehicle 105. In such embodiment, the calculation module 303 may determine an angle of at which the vehicle 105 is coupled to the trailer 113. Similar to determining the angle at which the longitudinal axis of the trailer 113 intersects the plane of reference, the calculation module 303 determines an angle at which a longitudinal axis of the vehicle 105 intersects the plane of reference. As such, in one embodiment, the calculation module 303 may further increase the trailer sway confidence if the longitudinal axis of the vehicle 105 is also offset from the plane of reference. While the calculation module 303 typically estimates the pitch angle of the vehicle 105 and/or the trailer 113 to determine the trailer sway confidence, it should be appreciated that the roll angle of the vehicle 105 and/or the trailer 113 or a combination of the pitch angel and the roll angle may also impact the likelihood of trailer sway occurring. For example, as an angle between a lateral axis of the vehicle 105 and/or the trailer 113 and the plane of reference increases/decreases, the trailer sway confidence increases accordingly.

It is contemplated that even when the tongue weight of the trailer 113 is within an acceptable range (e.g., within 10 to 15 percent), a longitudinal axis of the vehicle 105 and/or the trailer 113 may be offset from the plane of reference due to other reasons (e.g., uneven terrain, wind direction, etc.). As such, in one embodiment, the assessment platform 125 may analyze sensor data indicating the vehicle 105 and/or the trailer 113 over a period of time to determine the trailer sway confidence. For example, the sensor data may be image data depicting the vehicle 105 and/or the trailer 113 over a period of time. In such example, if the longitudinal axis of the vehicle 105 and/or the trailer 113 is offset from the plane of reference for a majority of the period, the assessment platform 125 may increase the trailer sway confidence.

In one embodiment, the calculation module 303 may perform image classification to estimate weight distribution of the trailer 113. In such embodiment, the calculation module 303 may identify trailer attributes associated with the trailer 113 by classifying one or more images of the trailer 113. The trailer attribute may indicate a model, type, classification, overall size of the trailer, sizes of components of the trailer, overall weight of the trailer, weight distribution (excluding loads within the trailer), tire size, tire load index capacity, etc. In one embodiment, the calculation module 303 may analyze the one or more images to determine whether the trailer 113 is carrying one or more loads thereon. If so, the calculation module 303 may classify the one or more loads to estimate the weight thereof and use the estimated weight of the one or more loads for estimating the weight distribution of the trailer 113. In one embodiment, the calculation module 303 performs image segmentation to divide an image of the trailer 113 into parts. In such embodiment, each segmented image may be classified to render estimation of a weight of said part. The estimation of weight of said part may be dependent on amount of space occupied by the portion of the trailer 113 as depicted in the segmented image and an angle at which the image of the trailer 113 is captured. Once the weight estimation is performed for each segmented image of the trailer 113, the calculation module 303 estimates the weight distribution of the trailer 113, identifies a location of trailers wheels, compares the weight distribution relative to said location. Based on such comparison, the calculation module 303 adjusts the trailer sway confidence. For example, if the calculation module 303 estimates that the weight of the trailer 113 is concentrated behind the trailer wheels, the calculation module 303 increases the trailer sway confidence.

Similar to performing image classification on one or more images of the trailer 113 and estimating the weight distribution of the trailer 113, the calculation module 303 may perform image classification on one or more images of the vehicle 105 to estimate the weight distribution of the vehicle 105. Specifically, such image classification is performed on image data acquired by one or more detection entities 115 that is proximate to the vehicle 105. Alternatively or additionally, the sensors 107 (e.g., oriental sensors, suspension sensors, etc.) may indicate weight distribution of the vehicle 105. Once the weight distribution of the vehicle 105 is identified, the calculation module 303 determines one or more areas in which the weight of the vehicle 105 is concentrated and adjusts the trailer sway confidence based on said areas. For example, if the weight of the vehicle 105 is biased towards the front or the back of the vehicle 105, the calculation module 303 increases the trailer sway confidence.

As discussed above, the calculation module 303 may determine whether the vehicle 105 is being impacted by trailer sway based on sensor data. In some cases, the initial phase of the trailer sway cannot be readily observed and perceived by a human. As such, sensor data indicating the initial phase are input to a machine learning model to determine whether the vehicle 105 is being impacted by trailer sway and the sway of the trailer 113 is intensifying. The calculation module 303 receives sensor data representing a series of movement of the vehicle 105 and/or the trailer 113 over a period of time. Such sensor data may be input to a machine learning model, and in response, the machine learning model may output data indicating whether the trailer 113 is being impacted by trailer sway. The machine learning model may be trained to identify trailer sway based on historical data of past events in which trailers were impacted by trailer sway. The historical data may include sensor data, such as image data, indicating series of movements associated with said trailers during said past events. The sensor data may indicate the series of movement from different positions and orientations. For example, the sensor data may be captured by a rear-facing camera of the vehicle 105, one or more side-view mirror cameras of the vehicle 105, one or more cameras of a vehicle proximate to the vehicle 105, etc. When the machine learning model receives sensor data, the machine learning model attempts to yield an accurate prediction by identifying historical data that share the same or similar attributes as the received sensor data (e.g., the same or similar type of vehicle, trailer, camera positions/orientations for capturing sensor data, etc.). If such sensor data are not available, the calculation module 303 may establish a model of the vehicle 105 and/or the trailer 113 based on the received sensor data, and the machine learning model may yield the prediction based on the model and the historical data.

In one embodiment, the calculation module 303 may determine the trailer sway confidence based at least in part on: (1) attributes of an environment in which the vehicle 105 is traversing and is estimated to traverse; (2) attributes of the vehicle 105 and/or the trailer 113; or (3) a combination thereof. In such embodiment, the calculation module 303 may receive location information associated with the vehicle 105, such as a current location of the vehicle 105 (e.g., GPS coordinates) and a route of the vehicle 105. Based on the location information, the calculation module 303 determines attributes of one or more environments associated with the location information, such as road attributes (e.g., road types, coefficient of friction of a road segment/link, road curvature, road condition, etc.), weather conditions, weather forecast information, POIs (e.g., camping grounds, forest preserves, tourism attraction sites, etc.), etc. The calculation module 303 may also receive attributes associated with the vehicle 105 and/or the trailer 113, such as vehicle/trailer model, type, classification, gross vehicle weight rating, etc. The attributes associated with the location information and/or the attributes associated with the vehicle 105 and/or the trailer 113 are input to a machine learning model to output the trailer sway confidence. In such embodiment, the machine learning model is trained based on historical data of events in which trailer sway have occurred. The historical data may be correlated with information on attributes of environment for said events and/or attributes of vehicles/trailers impacted within said events. For example, the historical data may indicate that a trailer sway event has occurred for a certain type of vehicle/trailer at a given road segment due to icy road conditions and high wind conditions impacting the road segment at the time of the event. When information on attributes of location information associated with the vehicle 105 and/or attributes of the vehicle 105 and/or the trailer 113 are input to the machine learning model, the machine learning model attempts to output an accurate measurement of trailer sway confidence by identifying historical data that are the same or similar to the received attribute information (e.g., the same or similar type of road attributes, weather conditions, same or similar type of vehicle/trailer, etc.). As such, the application of the machine learning model is not limited to vehicles/trailer types impacted by said past events and locations in which past events of trailer sway have occurred, but the machine learning model can be also applied for vehicle/trailer types that have no recorded instances of trailer sway and/or at locations in which no instances of trailer sway have been recorded. In one embodiment, the calculation module 303 may maintain and update a map layer that correlates locations with likelihoods of trailer sway occurring. In such embodiment, the map layer is maintained based on outputs of the machine learning model. Using the map layer, the calculation module 303 may generate a route to a destination for the vehicle 105 such that the vehicle 105 may avoid locations that are highly likely to induce trailer sway.

Once the trailer sway confidence is determined, the control/action module 305 determines whether the trailer sway confidence exceeds a threshold level. In such embodiment, the threshold level may indicate that trailer sway is highly likely to occur for the vehicle 105. If the threshold level is satisfied, the control/action module 305 may output a control signal to the vehicle 105 that causes the vehicle 105 to autonomously perform a driving maneuver that mitigates occurrence of trailer sway or further intensification thereof (e.g., causing the vehicle 105 to slow down, keeping the wheels of the vehicle 105 straight, causing the vehicle 105 to gradually decrease the speed thereof to a stop, etc.). The control/action module 305 may also output a control signal to one or more vehicles proximate to the vehicle 105 that causes said vehicles to autonomously perform a driving maneuver that mitigates potential impact with the vehicle 105 (e.g., causing said vehicles to slow down, change lanes, move past the vehicle 105, etc.).

The notification module 307 may cause a notification on the UE 101 and/or one or more other UEs associated with the vehicle 105 and/or one or more other vehicles proximate to the vehicle 105. The notification may indicate that the vehicle 105 and the trailer 117 is currently being impacted by initial stages of trailer sway or a likelihood in which trailer sway will occur for the trailer 117. The notification may include sound notification, display notification, vibration, or a combination thereof. In one embodiment, the notification module 307 may provide the notification to a local municipality/establishment. In one embodiment, the notification module 307 may: (1) cause the vehicle 105 to alert one or more vehicles proximate to the vehicle 105 via vehicle lights, hazard lights, vehicle horn, V2V communication, and/or other alerting systems; (2) cause one or more vehicles proximate to the vehicle 105 to alert the vehicle 105 and/or one or more other vehicles via vehicle headlights, vehicle horn, V2V and/or other alerting systems; or (3) a combination thereof.

Figure 5:
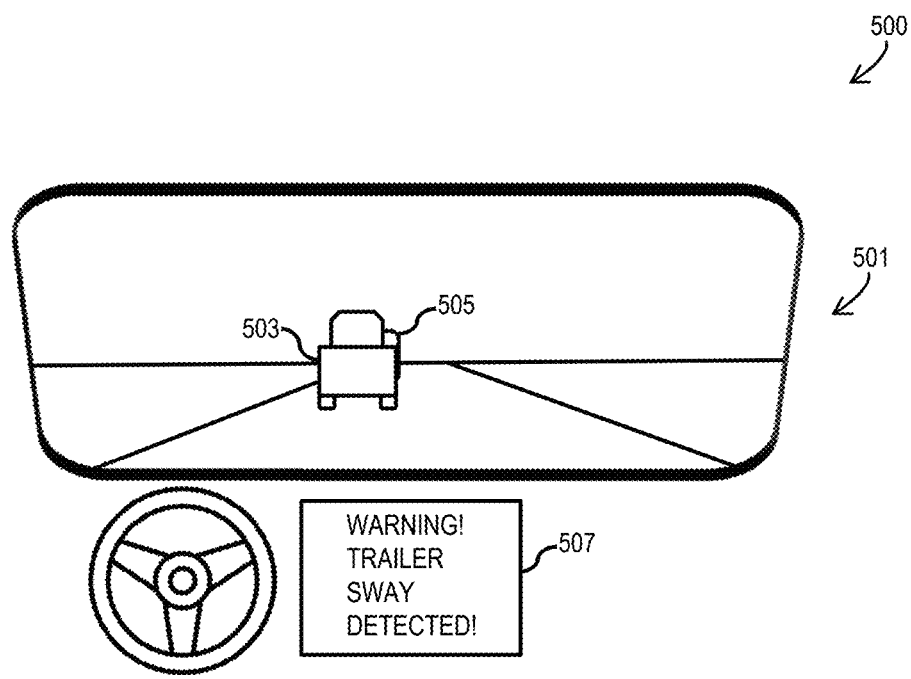
FIG. 5 illustrates an example perspective view from a vehicle cabin.
Figure 6:
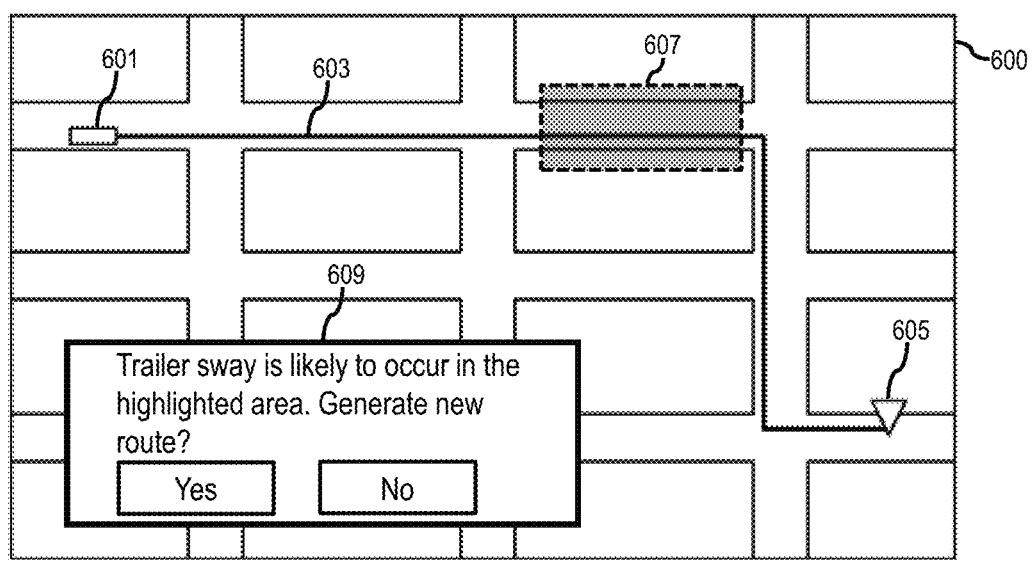
FIG. 6 illustrates an example visual representation of a map layer indicating one or more locations that is likely to induce trailer sway.

The presentation module 309 obtains a set of information, data, and/or calculated results from other modules, and continues with providing a visual representation to the UE 101 and/or any other user interface associated with the vehicle 105 and/or one or more vehicles proximate to the vehicle 105. The visual representation may indicate any of the information presented by the notification module 307. For example, FIG. 5 illustrates an example perspective view 500 from a vehicle cabin. In the illustrated example, a first vehicle 501 is driving behind a second vehicle 503 towing a trailer 505. The first vehicle 501 transmits sensor data to the assessment platform 125 and in response, the presentation module 309 causes a user interface 507 of the vehicle 501 to display a message stating "WARNING! TRAILER SWAY DETECTED!" In one embodiment, the presentation module 309 may cause the UE 101 to present a map layer indicating locations that are likely to induce trailer sway. For example, FIG. 6 illustrates an example visual representation 600 of a map layer indicating one or more locations that is likely to induce trailer sway. In the illustrated example, a vehicle 601 towing a trailer is following a route 603 to reach a destination 605. The assessment platform 125 checks whether the route 603 is associated with a location that is likely to induce trailer sway and further determines that a trailer sway confidence associated with an area 607 exceeds a threshold level. As such, the presentation module 309 highlights the are 607 and generates a message stating "TRAILER SWAY IS LIKELY TO OCCUR IN THE HIGHLIGHTED AREA. GENERATE NEW ROUTE?" Other visual representations depicting detection of trailer sway events are contemplated.

The above presented modules and components of the assessment platform 125 can be implemented in hardware, firmware, software, or a combination thereof. Though depicted as a separate entity in FIG. 3, it is contemplated that the assessment platform 125 may be implemented for direct operation by the UE 101, the vehicle 105, the detection entity 115, the services platform 117, one or more of the content providers 121, or a combination thereof. As such, the assessment platform 125 may generate direct signal inputs by way of the operating system of the UE 101, the vehicle 105, the detection entity 15, the services platform 117, the one or more of the content providers 121, or the combination thereof for interacting with the applications 103. The various executions presented herein contemplate any and all arrangements and models.

Figure 7:
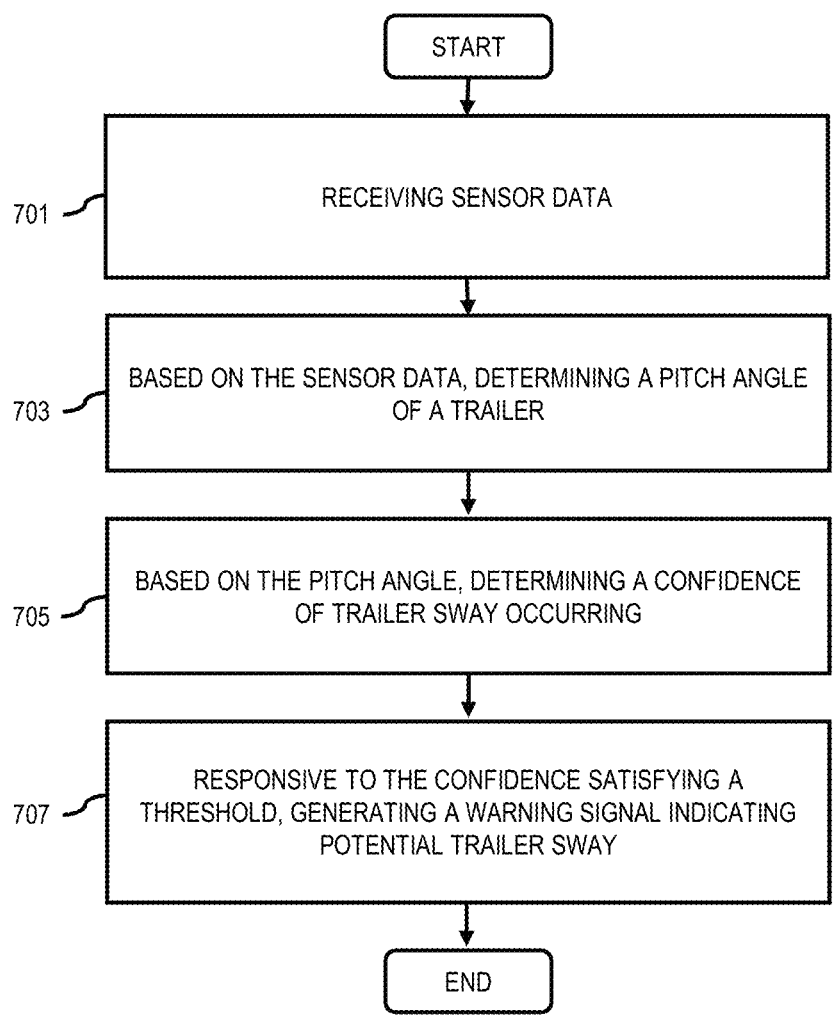
FIG. 7 illustrates a flowchart of a process for providing trailer sway detection.
Figure 9:
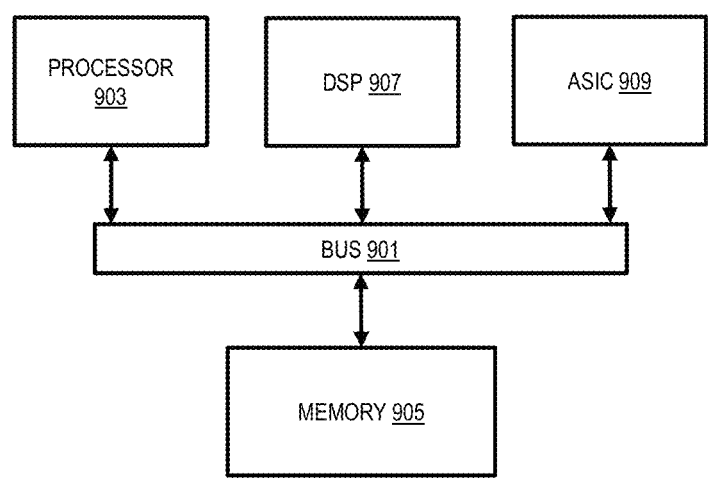
FIG. 9 illustrates a chip set or chip upon which an embodiment may be implemented.

FIG. 7 is a flowchart of a process 700 for providing trailer sway detection, according to one embodiment. In one embodiment, the assessment platform 125 performs the process 700 and is implemented in, for instance, a chip set including a processor and a memory as shown in FIG. 9.

In step 701, the assessment platform 125 receives sensor data indicating the vehicle 105 and/or the trailer 113. The sensor data may be one or more images of the vehicle 105 and/or the trailer 113. In one embodiment, the sensor data may be a plurality of images of the vehicle 105 and/or the trailer 113 recorded over a period of time. The sensor data may be captured via one or more of the sensors 107 of the vehicle 105, one or more sensors of one or more detection entities 115 proximate to the vehicle 105, or a combination thereof.

In step 703, the assessment platform 125 determines a pitch angle of the trailer based on the sensor data. The pitch angle is defined by an angle at which a longitudinal axis of the trailer 113 (i.e., a direction at which the trailer 113 extends) intersects a plane of reference. The plane of reference may be a horizontal plane (i.e., a plane that is perpendicular to an axis stretching from the center of the earth to an object of interest, such as the trailer 113). In some scenarios, the plane of reference may be a plane that is parallel to a surface of a ground that is local to the object of interest.

In step 705, the assessment platform 125 determines a confidence of trailer sway occurring based on the pitch angle. For example, the assessment platform 125 increases the confidence as the angle at which the longitudinal axis of the trailer 113 intersects the plane of reference increases and vice-versa.

In step 707, if the confidence exceeds a threshold, the assessment platform 125 generates a warning signal indicating potential trailer sway. The warning signal may be used by the vehicle 105 to alert occupants of the vehicle 105, nearby vehicles regarding the potential trailer sway, or a combination thereof. The warning signal may also used by one or more vehicles proximate to the vehicle 105 to alert occupants of said vehicles, the vehicle 105, or a combination thereof. In one embodiment, the warning signal causes the vehicle 105 to perform a driving maneuver that mitigates occurrence of trailer sway or further intensification thereof. In one embodiment, the warning signal causes one or more vehicles proximate to the vehicle 105 to perform a driving maneuver that mitigates impact with the vehicle 105.

The system, apparatus, and methods described herein enable a system to reliably detect potential trailer sway events based on sensor data, thereby preventing occurrences of trailer sway and improving safety. Further, in the event that the system detects a potential trailer sway event associated with a vehicle and a trailer thereof, the system provides information indicating such event to not only the vehicle, but one or more other vehicles proximate to said vehicle. As such, overall safety within a road network is drastically improved.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
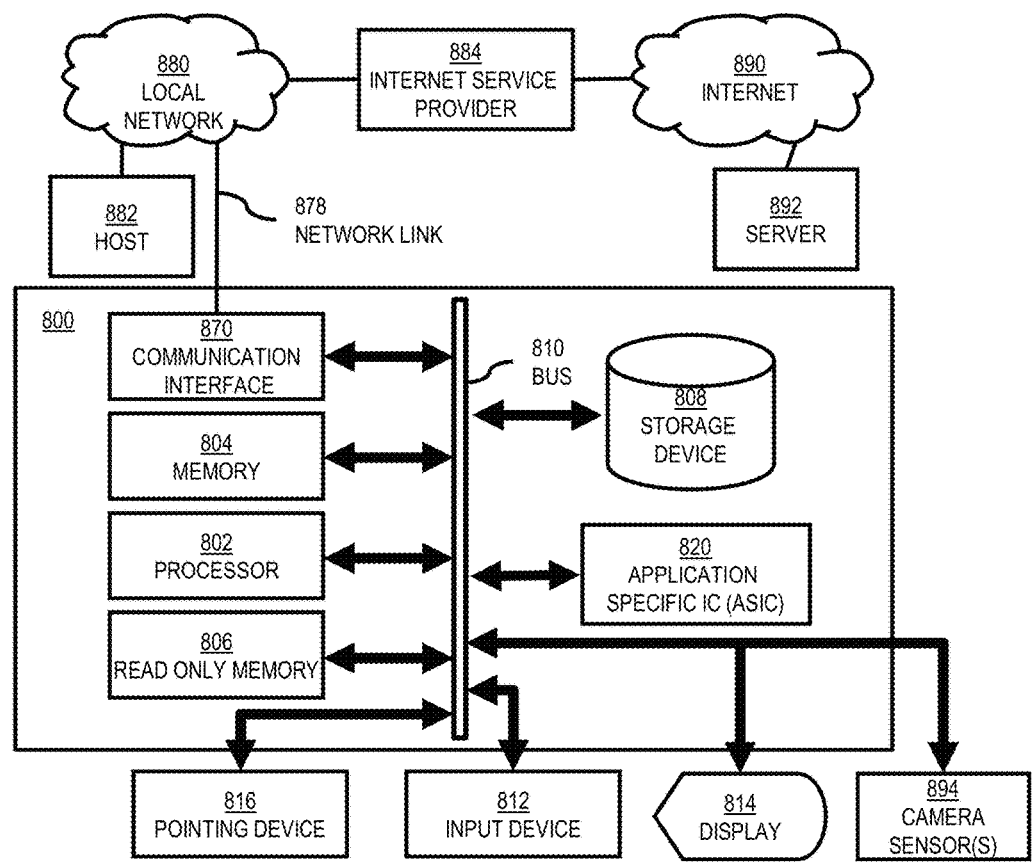
FIG. 8 illustrates a computer system upon which an embodiment may be implemented.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide trailer sway detection as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing trailer sway detection.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing trailer sway detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing trailer sway detection. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing trailer sway detection, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.)

which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 123 for providing trailer sway detection to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 882 connected to the Internet hosts a process that provides a service in response to information received over the Internet. For example, server host 882 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 882 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide trailer sway detection as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing trailer sway detection.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real-time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors. The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide trailer sway detection. The memory 905 also stores the data associated with or generated by the execution of the inventive steps.

Figure 10:
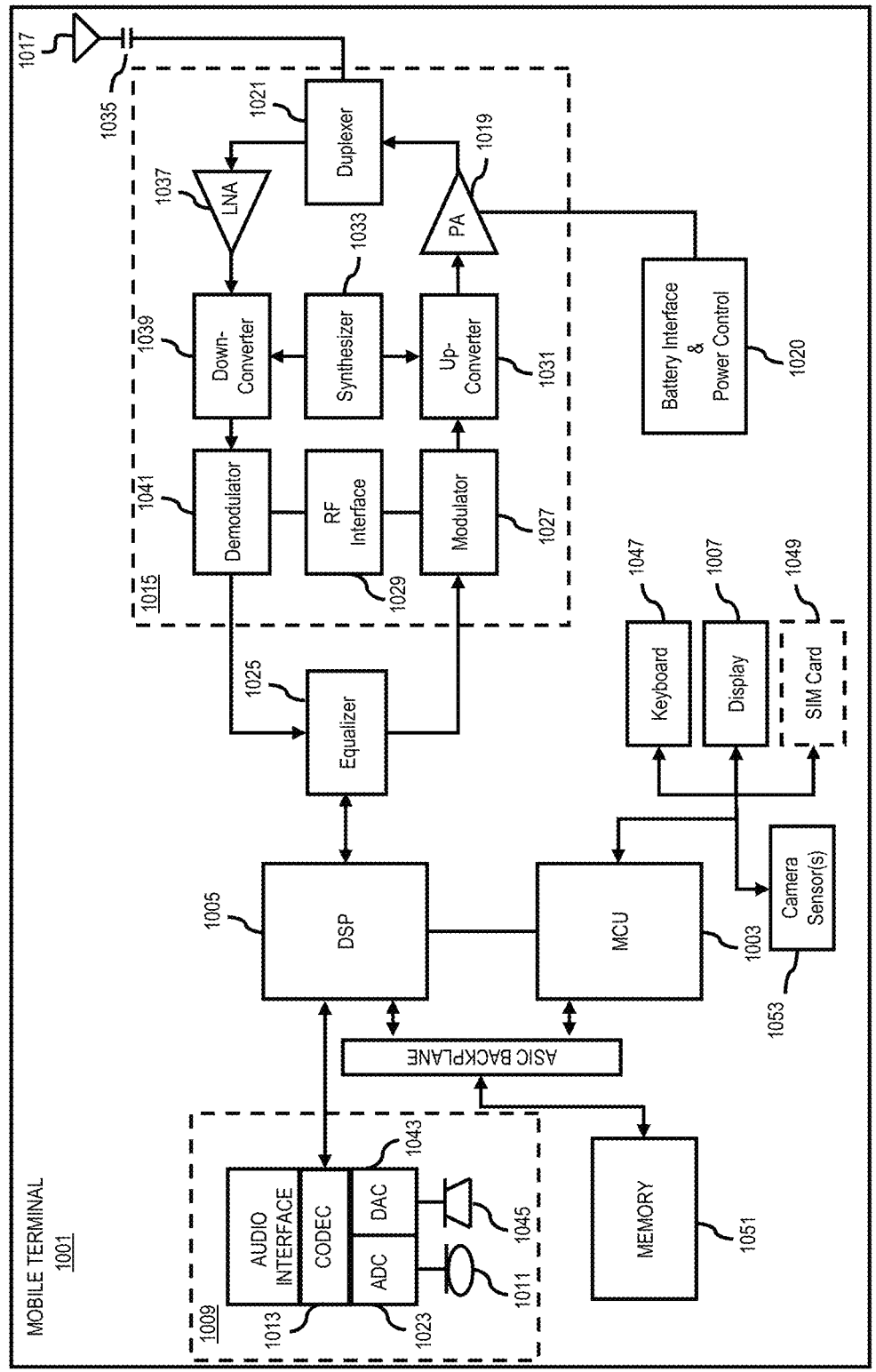
FIG. 10 illustrates a diagram of exemplary components of a mobile terminal for communications, which is capable of operating in the system of FIG. 1.

FIG. 10 is a diagram of exemplary components of a mobile terminal 1001 (e.g., a mobile device or vehicle or part thereof) for communications, which is capable of operating in the system of FIG. 1, according to one embodiment. In some embodiments, mobile terminal 1001, or a portion thereof, constitutes a means for performing one or more steps of providing trailer sway detection. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing trailer sway detection. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide trailer sway detection. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1010 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1149 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   receive sensor data;
   based on the sensor data, determine a pitch angle of a trailer, wherein the pitch angle is defined by an angle at which a direction and a horizontal plane intersects, wherein the trailer extends along the direction, and wherein the horizontal plane is a plane that is parallel to a surface of a ground local to the trailer or is a plane that is perpendicular to an axis stretching from the center of the earth to the trailer;

based on the pitch angle, determine a confidence of trailer sway occurring;

receive first attribute data associated with a first location in which the trailer is positioned;

input the first attribute data to a machine learning model;

based on an output of the machine learning model as a function of the first attribute data, determine the confidence, wherein the machine learning model is trained based on historical data of one or more past events in which one or more vehicles towing one or more other trailers was swaying, the historical data including second attribute data associated with one or more second locations of the one or more past events; and responsive to the confidence exceeding a threshold, generate a warning signal indicating potential trailer sway.

2. The apparatus of claim 1, wherein the confidence increases as the pitch angle indicates that a connecting end of the trailer is vertically declining.

3. The apparatus of claim 1, wherein the pitch angle is the first pitch angle, and wherein the computer program code instructions are further configured to, when executed, cause the apparatus to:

based on the sensor data, determine a second pitch angle of a vehicle towing the trailer; and based on the second pitch angle, determine the confidence.

4. The apparatus of claim 3, wherein the confidence increases as the second pitch angle indicates that a connecting end of the vehicle is vertically declining.

5. The apparatus of claim 1, wherein the sensor data are image data captured by an image capturing device, lidar-based data captured by a lidar sensor, or a combination thereof.

6. The apparatus of claim 1, wherein the sensor data is acquired via one or more sensors equipped by one or more vehicles proximate to a vehicle towing the trailer.

7. The apparatus of claim 1, wherein the sensor data is acquired via one or more sensors equipped by a vehicle towing the trailer.

8. The apparatus of claim 1, wherein the sensor data include image data, and wherein the computer program code instructions are further configured to, when executed, cause the apparatus to:

using the image data, perform an image classification of the trailer, one or more objects on or within the trailer, or a combination thereof;

based on the image classification, estimate a weight of the trailer, the one or more objects, or the combination thereof; and based on the weight, determine the confidence.

9. A method of providing trailer sway detection, the method comprising:

receiving sensor data;

based on the sensor data, determining a pitch angle of a trailer, wherein the pitch angle is defined by an angle at which a direction and a horizontal plane intersects, wherein the trailer extends along the direction, and wherein the horizontal plane is a plane that is parallel to a surface of a ground local to the trailer or is a plane that is perpendicular to an axis stretching from the center of the earth to the trailer;

based on the pitch angle, determining a confidence of trailer sway occurring;

receive first attribute data associated with a first location in which the trailer is positioned;

input the first attribute data to a machine learning model;

based on an output of the machine learning model as a function of the first attribute data, determine the confidence, wherein the machine learning model is trained based on historical data of one or more past events in which one or more vehicles towing one or more other trailers was swaying, the historical data including second attribute data associated with one or more second locations of the one or more past events; and responsive to the confidence exceeding a threshold, causing a notification indicating potential trailer sway on a user equipment (UE).

10. The method of claim 9, wherein the UE is a mobile device, a first user interface within a vehicle towing the trailer, a second user interface within another vehicle proximate to the vehicle, or a combination thereof.

11. A non-transitory computer-readable storage medium having computer program code instructions stored therein, the computer program code instructions, when executed by at least one processor, cause the at least one processor to:

receive sensor data;

based on the sensor data, determine a pitch angle of a trailer, wherein the pitch angle is defined by an angle at which a direction and a horizontal plane intersects, wherein the trailer extends along the direction, and wherein the horizontal plane is a plane that is parallel to a surface of a ground local to the trailer or is a plane that is perpendicular to an axis stretching from the center of the earth to the trailer;

based on the pitch angle, determine a confidence of trailer sway occurring;

receive first attribute data associated with a first location in which the trailer is positioned;

input the first attribute data to a machine learning model;

based on an output of the machine learning model as a function of the first attribute data, determine the confidence, wherein the machine learning model is trained based on historical data of one or more past events in which one or more vehicles towing one or more other trailers was swaying, the historical data including second attribute data associated with one or more second locations of the one or more past events; and responsive to the confidence exceeding a threshold, generate a warning signal indicating potential trailer sway.

12. The non-transitory computer-readable storage medium of claim 11, wherein the confidence increases as the pitch angle indicates that a connecting end of the trailer is vertically declining.

13. The non-transitory computer-readable storage medium of claim 11, wherein the pitch angle is the first pitch angle, and wherein the computer program code instructions, when executed by the at least one processor, cause the at least one processor to:

based on the sensor data, determine a second pitch angle of a vehicle towing the trailer; and based on the second pitch angle, determine the confidence.

14. The non-transitory computer-readable storage medium of claim 13, wherein the confidence increases as the second pitch angle indicates that a connecting end of the vehicle is vertically declining.

15. The non-transitory computer-readable storage medium of claim 11, wherein the sensor data are image data captured by an image capturing device, lidar-based data captured by a lidar sensor, or a combination thereof.

16. The non-transitory computer-readable storage medium of claim 11, wherein the sensor data is acquired via one or more sensors equipped by one or more vehicles proximate to a vehicle towing the trailer.

17. The non-transitory computer-readable storage medium of claim 11, wherein the sensor data is acquired via one or more sensors equipped by a vehicle towing the trailer.

* * * * *